May 6, 1958  V. C. JOHNSON  2,833,546
UNIVERSAL TOOL HOLDER
Filed Dec. 19, 1956
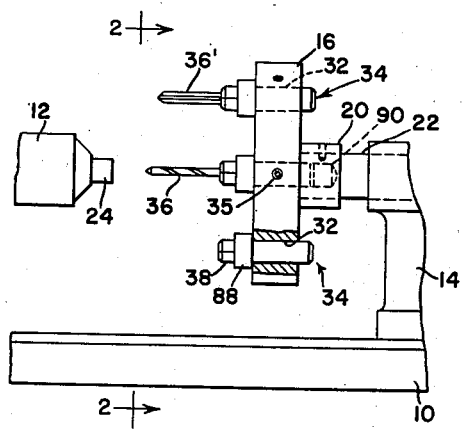
FIG. 1
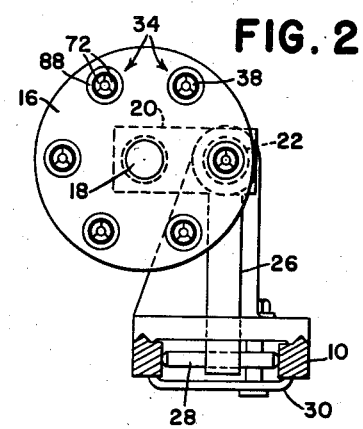
FIG. 2
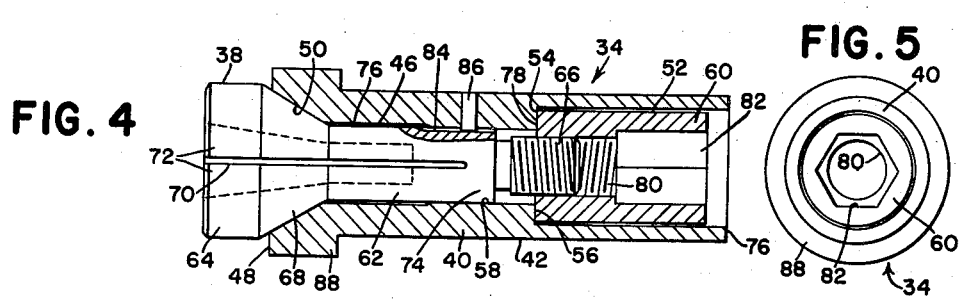
FIG. 4  FIG. 5
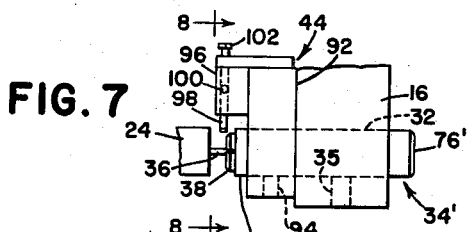
FIG. 7
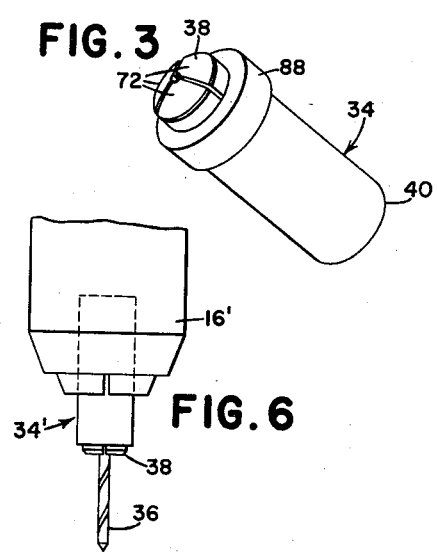
FIG. 3
FIG. 6
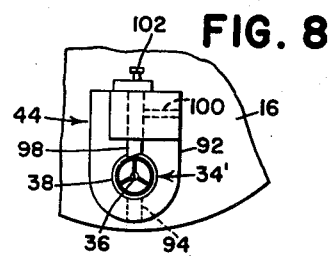
FIG. 8
INVENTOR.
V. C. JOHNSON
BY
ATTORNEY

United States Patent Office 2,833,546
Patented May 6, 1958

2,833,546

UNIVERSAL TOOL HOLDER

Victor C. Johnson, Davenport, Iowa

Application December 19, 1956, Serial No. 629,323

1 Claim. (Cl. 279—51)

This application is a continuation-in-part of my co-pending application Serial No. 461,635, now Patent No. 2,783,664 and the invention relates to a machine tool and more particularly to a tool holder or adapter having wide flexibility and universality in a variety of machining operations.

It is a significant object of the invention to provide a universal tool holder adapted not only to mount tools internally but externally as well; to be mountable in various machine tools such as turret heads, jig bores, drill presses and the like. The invention features a precision adapter for maintaining concentricity within tolerances heretofore experienced only at tremendous cost, if at all. The adapter is characterized by simplicity of construction, low cost and extremely wide flexibility, and fundamentally comprises only three basic parts, each of which is readily precisely located relative to the others to insure the utmost in accuracy and precision.

These and other important objects and desirable features inherent in and encompassed by the invention will become apparent as a preferred embodiment thereof is disclosed by way of example in the ensuing specification and accompanying sheet of drawings, the several figures of which are described below:

Figure 1 is a fragmentary view, partly in section, showing a plurality of the inventive adapters in use in a turret head of the character forming the subject matter of the above mentioned U. S. patent.

Figure 2 is a section on the line 2—2 of Figure 1.

Figure 3 is a perspective, on an enlarged scale, of the adapter as equipped with a collet.

Figure 4 is a considerably enlarged longitudinal section through the adapter and collet assembly.

Figure 5 is an end view of Figure 4.

Figure 6 shows a modified form of adapter as used in a drill press, for example.

Figure 7 is a fragmentary elevation showing the turret-head-mounted adapter supporting an additional tool.

Figure 8 is a view as seen along the line 8—8 of Figure 7.

In the construction shown in Figure 1 the numeral 10 represents the bed of a lathe which may be of any conventional construction, having a chuck 12 and a tail stock 14. A turret head 16 is supported on a horizontal axis by means of a central shaft 18 and one or more suitable supporting blocks 20, the details of which are set forth in the patent already referred to. A second shaft 22, parallel to the shaft 18, supports the turret head 16 in the tail stock 14 for movement toward and away from the chuck 12, which is here shown as coaxially carrying the work 24. As shown in Figure 2 a depending leg 26 is stabilized by a cross pin 28 between the ways of the lathe bed 10. The numeral 30 indicates a conventional tail stock clamp.

The turret head illustrated is of the six-station type having a plurality of bores 32 parallel to the turret head shafts 18 and 22. Each of the bores may carry an adapter or universal tool holder, designated in its entirety by the numeral 34, forming the subject of this application. Each tool holder is fixed in place in the turret head as by a set screw 35. The purpose of the plurality of holders 34 is to mount a plurality of different type tools, a drill being shown at 36 and a reamer at 36' as representative. Each tool is chucked by a colllet 38, the details of which are best illustrated in Figure 4.

As there shown, the adapter or holder comprises an elongated body 40 having an outer cylindrical surface 42 finished with utmost precision so as to be perfectly concentric, whereby the holder is axially receivable in and withdrawable from any one of the sockets afforded by the bores 32 in the turret head 16 which may be generically considered as a carrying element. In a modified form of holder as at 34' in Figure 6, the carrying element is represented by a drill press chuck 16'. In Figures 7 and 8 the modified holder 34' supports an additional or secondary tool 44. The characteristics of these variations will be discussed below in detail, the instant digression being resorted to merely to demonstrate the flexibility or universality of the assembly 34 or its equivalent 34'.

The immediately ensuing description will refer again to Figure 4. The tubular body 40 has an axial front bore 46 which opens at the front end 48 of the body generally as a truncated conical annulus 50 and extends rearwardly somewhat more than half the length of the body 40 at which point it adjoins a rear counter bore 52. The counter bore 52 is of course larger than the front bore 46 and the junction therebetween forms an annular shoulder 54 which presents a rearwardly facing annular radial surface 56. The rear part of the front bore 46, at at 58, is formed with utmost precision and accuracy and is therefore perfectly concentric with the cylindrical outer surface 42, and the radial surface 56 is accurately perpendicular to the axis of the bore portion 58, and thus this surface becomes important as a locating surface for the collet 38 and a cylindrical drawbar 60.

The collet 38 is of elongated structure having an intermediate cylindrical shank 62, a coaxial front head 64 and a coaxial rear externally threaded extension 66. The junction between the head 64 and the shank 62 is of truncated conical form at 68 to accurately mate with the body annulus 50, thus accurately locating the forward portion of the collet. The collet may be conventionally split at 70 to provide a plurality of collet jaws 72. The rear portion of the shank 62 is precision finished at 74 to concentrically accurately locate in the rear bore portion 58, the forward portion of the bore 46 being relieved somewhat as at 76. In the preferred unit shown, the diameter of the cylindrical surface 42 is .500 inch and the relief at 76 may be on the order of .002 inch. Thus, the collet is located at its front end at 50—68 and at its rear end at 58—74.

The cylindrical drawbar 60 extends through the open rear end 76 of the body 40 and has a front radial face 78 which precisely abuts the radial surface 56 at the junction 54 between the bore 46 and the counter bore 52. Precision at this point is significant. The diameter of the drawbar 60 may be slightly less than the internal diameter of the counter bore 50, say on the order of .0005 inch, the tolerances being provided so that accurate location of the collect will rely on the zones previously noted (50—68 and 58—74), together with precision external threading on the shank extension 66 plus cooperative internal threads in a drawbar bore 80. The rear end of the drawbar is recessed or socketed at 82 to receive a tool such as the well-known Allen wrench; although a screw driver slot will give beneficial results.

From the description thus far it will be seen that as the collet 38 is held against rotation in the body 40 and the drawbar 60 rotated clockwise as seen in Figure 5, the collet will be drawn axially into the body so as to compress the collet jaws 72 on a tool such as those shown at 36 and 36'. The means for permitting axial movement of the collet while preventing rotation thereof relative to the body 40 is here shown as comprising a key-way 84 running lengthwise in the cylindrical surface of the shank 62 and a cooperating pin or key 86 extending radially through the tubular wall of the body 40 and into the key-way.

In the use of the unit 34 in the turret head 16, for example, an annular shoulder 88 on the body 40 at its front end serves the dual function of affording a stop and increasing the strength of the body, particularly to accommodate the conical annulus 50. It should also be noted that the drawbar is always contained within, or at least does not extend rearwardly beyond, the rear end 76 of the body. This is significant in cutting down the axial length of the assembly, as well as clearing the end 76 of the assembly from interference with cooperating parts. For example, the turret head block 20 (Figure 1) is axially socketed at 90 and the unit 34 in alinement therewith is received by that socket to lock the turret head 16 against rotation. As explained in the above noted patent, the turret head 16 and shaft 18 are shifted forwardly relative to the shaft 22 and block 20 to disengage the rear end 76 of the unit 34 from the block so that the turret can be rotated about the axis of the shaft 18 for selecting new stations. This again demonstrates the versatility of the unit or holder 34.

In the modified unit 34' shown in Figure 6, the shoulder 88 is omitted. Nevertheless, the units 34 and 34' are identical in other respects.

The unit 34' is shown in Figures 7 and 8 as being mounted in one of the sockets or bores 32 of the turret head 16, its rear head projecting freely at 76' for receipt at times by the socket 90 in the turret head block 20, and its front end 48' projecting ahead of the turret head 16 to mount the secondary tool 44 thereon. In the example shown the secondary tool has a body 92 held rigid to the front end of the unit 34' as by a set screw 94. An overhanging portion 96 of the body 92 serves to carry a tool 98 such as a cut off or facing tool for operating on the work 24. A set screw 100 secures the position of the tool 98 relative to the body 44 and the tool may be propelled by an adjusting screw 102.

The unit 34 (or 34') has the unique ability, especially when used in a drill press or jig borer to accurately hold concentricity when using relatively small drills, for example, any one of which could not be accurately held by a drill press chuck. For example, a one-half inch drill press chuck is simply not capable of maintaining concentricity with a No. 80 drill. However, such chuck will maintain concentricity with the unit 34 and that unit, because of the internal and external precision built into it and attributable to the locational characteristics already described, will accurately maintain concentricity with the indicated drill and even smaller drills. A feature such as this is extremely important in the machining of delicate and minute parts in which an accurate orifice, for example, is a must. As already indicated, the unit 34 can carry tools not only internally but externally and in addition to the secondary tool 44, the unit 34 may mount other types of tools as well as gauges.

Features of the invention other than those categorically enumerated will undoubtedly occur to those versed in the art, as will many modifications and alterations in the preferred embodiment disclosed, all of which may be achieved without departure from the spirit and scope of the invention.

What is claimed is:

For use in a machine tool having a carrying element providing a cylindrical open-ended socket, a tool holder comprising: a tubular body having an exterior cylindrical surface fitting said socket to enable axial insertion and withdrawal of said body relative to said socket, said body having front and rear ends and being formed with a front axial bore opening at said front end as a truncated conical annulus and extending rearwardly into said body, and said body having a rear larger counterbore opening at said rear end and extending forwardly into the body to adjoin the front bore at an inner annular radial shoulder ahead of and facing said rear end; tool-gripping means axially rearwardly receivable in and forwardly removable from the front bore and having an annular truncated conical front head rearwardly engaging the aforesaid truncated conical annulus for supporting a coaxial forwardly extending first tool means, an integral cylindrical shank fitting said front bore and terminating in a solid rear end portion ahead of said shoulder, and a coaxial externally threaded solid extension integral with the shank rear end portion and projecting rearwardly therefrom past said shoulder and terminating forwardly of said rear end of the body; said front end of the body having an exterior concentric cylindrical portion for supporting a second tool means; means cooperative between the body and tool-gripping means for preventing relative turning thereof while permitting relative axial movement; said truncated annulus at the front end of the body and the truncated head on the tool-gripping means being accurately mated to locate the front end of the tool-gripping means concentrically in the body, and the solid rear end portion of the shank having thereon just ahead of the threaded extension a rear cylindrical surface accurately mated with the proximate interior surface portion of the body front bore so as to locate the rear part of the tool-gripping means concentrically in the body, said shank and front bore being further so dimensioned as to provide a relief annulus about the shank intermediate its head and said rear cylindrical surface; and a rotatable cylindrical drawbar closely but loosely fitting the counterbore and forwardly receivable in and rearwardly removable from said counterbore, said drawbar having an internally threaded axial bore threadedly engaging the shank extension and a front annular radial face abutting the aforesaid shoulder, and said drawbar being normally wholly within the counterbore and having a rear part including means axially accessible through the open rear end of the counterbore for effecting turning thereof relative to the body and tool-gripping means to draw said tool-gripping means rearwardly relative to the body.

References Cited in the file of this patent

UNITED STATES PATENTS

| 2,469,160 | Evans | May 3, 1949 |
| 2,698,754 | Bernstein | Jan. 4, 1955 |